United States Patent [19]

Peterson

[11] Patent Number: 5,748,429
[45] Date of Patent: May 5, 1998

[54] SELF CHECKING TEMPERATURE SENSING CIRCUIT

[75] Inventor: Scott M. Peterson, Eden Prairie, Minn.

[73] Assignee: Honeywell Inc., Minneapolis, Minn.

[21] Appl. No.: 707,878

[22] Filed: Sep. 9, 1996

[51] Int. Cl.$^6$ .................................................. H02H 5/04
[52] U.S. Cl. ............................................. 361/106; 219/484
[58] Field of Search .................................. 361/106, 103, 361/24, 27; 338/22 R; 374/163; 219/663, 665, 667, 668, 483–485, 510

[56] References Cited

U.S. PATENT DOCUMENTS

| | | | |
|---|---|---|---|
| 3,708,720 | 1/1973 | Whitney et al. | 361/27 |
| 3,728,702 | 4/1973 | Miyamoto et al. | 340/595 |
| 3,903,743 | 9/1975 | Noller | 374/181 |
| 4,702,619 | 10/1987 | Camp et al. | 374/144 |
| 5,043,692 | 8/1991 | Sites et al. | 338/28 |
| 5,057,674 | 10/1991 | Smith-Johannsen | 219/553 |
| 5,070,932 | 12/1991 | Vlasak | 165/29 |
| 5,072,879 | 12/1991 | Noye | 237/8 R |
| 5,296,996 | 3/1994 | Hansson et al. | 361/24 |

*Primary Examiner*—Jeffrey A. Gaffin
*Assistant Examiner*—Michael J. Sherry
*Attorney, Agent, or Firm*—Charles L. Rubow

[57] ABSTRACT

A self-checking temperature sensing circuit in which temperature sensitivity is provided by first and second resistive elements having positive and negative temperature coefficients respectively. The resistive elements are connected in parallel current paths, one of which includes a diode for allowing only unidirectional current flow. The resistances of the restrictive elements are determined by a circuit which periodically reverses the polarity of a voltage applied across the parallel paths.

11 Claims, 5 Drawing Sheets

SELF CHECKING TEMPERATURE SENSING CIRCUIT

FIELD OF THE INVENTION

The present invention relates generally to temperature sensing sensors and devices, and more specifically to a temperature sensing circuit employed to detect temperature and prevent unsafe conditions of a heating plant, e.g., a boiler or the like.

BACKGROUND OF THE INVENTION

Resistive temperature sensors are well known in the art. They may be constructed to have either a negative or a positive temperature coefficient of resistance. Those temperature sensor components commonly referred to as "thermistors" generally have a negative temperature coefficient (NTC)—that is, the sensor resistance or impedance decreases with increasing temperature. In contrast, some silicon or platinum temperature sensors have a positive temperature coefficient (PTC)—that is, the sensor resistance or impedance increases with increasing temperature.

Most heating plants, for example, boilers and furnaces, require a "high limit" temperature sensor which forms, in part, a high limit safety control circuit to shut down the heating plant if certain temperature parameters are exceeded. For example, the water temperature of a boiler may be sensed to detect an unsafe boiler water temperature. Standards regarding boilers and associated high limit functions, or the like, are identified in Underwriters Laboratories (UL) Standard UL353.

One type of a commonly employed high limit temperature sensor associated with heating plant equipment is a electro-mechanical bi-metal temperature sensing device. Mechanical expansion of the bi-metal causes mechanical forces to act on a mechanical switch which in turn causes the heating plant to turn off. Such devices are not prone to the anomalies of electronic circuit components.

Although advancement of the electronic arts for heating plant control applications is wide spread, employment of the aforesaid resistive type temperature sensing components has been generally avoided because of the unpredictable failure mode of such devices. For example, if the resistance of a NTC temperature sensor indicates a lower temperature than is truly present, the heating plant may continue operation and over heat the heating plant, and potentially operate the heating plant in a hazardous condition. The latter sensor failure condition may be caused by, among others, drift in the sensor resistance, as well as an increase in the resistance in the electrical circuit at interconnecting electrical contacts—higher resistance meaning lower temperature. It should be noted that a short circuited NTC temperature sensor is a safe failure mode for heating plant applications since it would indicate a high limit temperature intended to be detected. In contrast, a short circuited PTC temperature sensor and associated circuitry is an unsafe failure for heating plant applications since it would indicate a low temperature. However, at the same time a PTC temperature sensor has safe failure due to any increase in contact resistance or open condition.

SUMMARY OF THE INVENTION

An object of the present invention is to provide a temperature sensing circuit employing resistive temperature sensors suitable for high limit heating plant temperature detection which has a safe failure mode. In accordance with the present invention, two series circuits are connected in parallel and between two nodes. One of the series circuits includes a positive temperature coefficient resistive temperature sensing sensor, and the other series circuit includes a series combination of a negative temperature coefficient resistive temperature sensing sensor in series combination with a rectifying circuit component. The nominal values and temperature coefficients of both the positive and negative temperature coefficient temperature sensing sensors are selected such that the effective impedance of the parallel combination of two series circuits characteristically exhibits a relatively low temperature coefficient of resistance over a selected temperature region in comparison to either of the positive or negative temperature coefficient temperature sensing sensors alone.

DETAILED DESCRIPTION OF THE INVENTION

Figure 1:
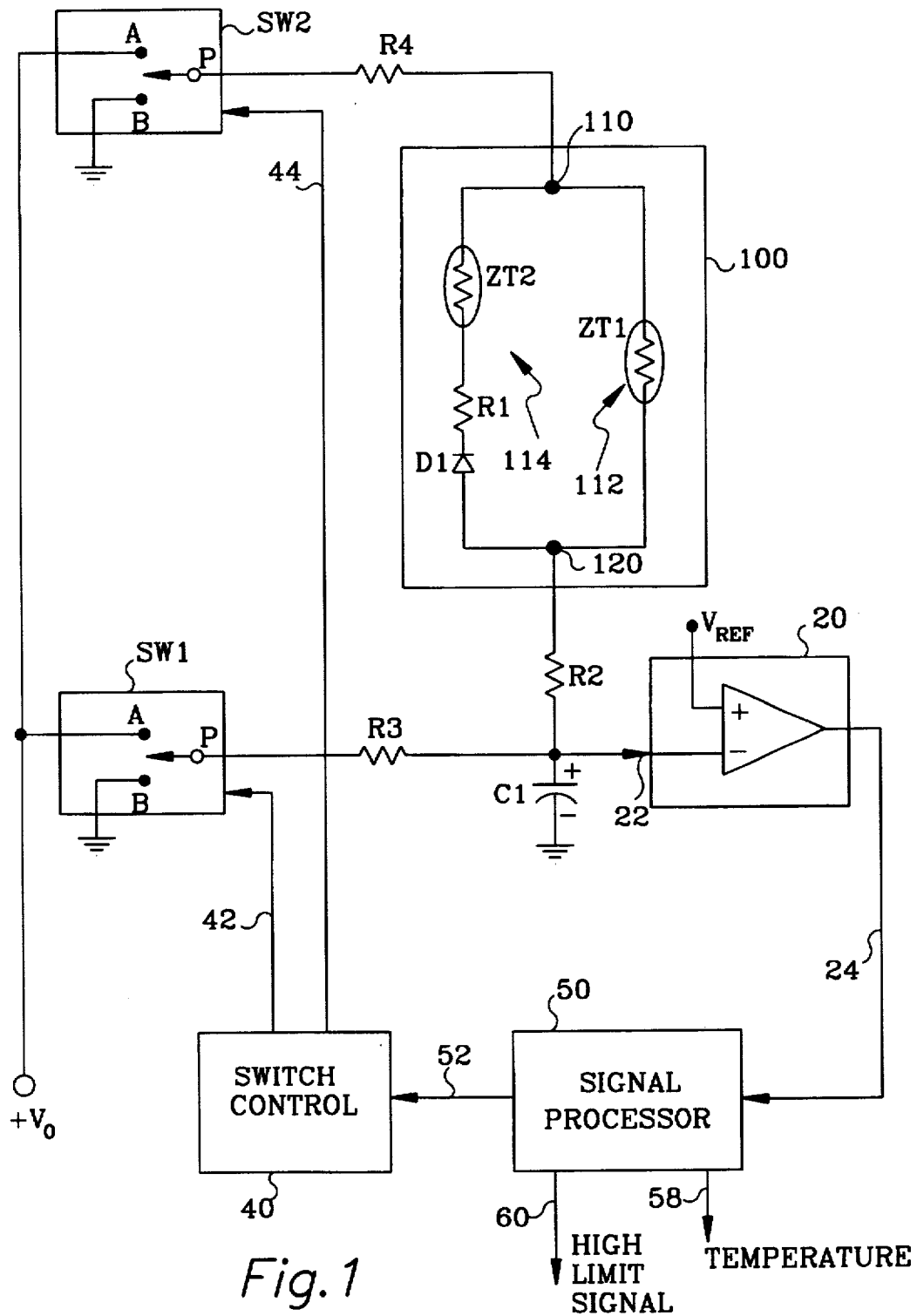
FIG. 1 is a combination schematic circuit diagram and block diagram of the present invention.

Illustrated in FIG. 1 is a combination schematic circuit diagram and block diagram of a self checking temperature sensor system in accordance with the present invention. Thereshown is a temperature sensing circuit 100 having a first electrical circuit terminating means or node 110 and a second node 120. A first series circuit 112 is connected between the first and second nodes 110 and 120, and comprises a PTC resistive temperature sensing component identified as ZT1. A second series circuit 114 in parallel with the first series circuit 112 is also connected between the first and second nodes 110 and 120, and includes the series combination of NTC resistive temperature sensing component ZT2, resistor R1, and diode D1.

As illustrated in FIG. 1, the anode of diode D1 is electrically connected to node 120, and the cathode is electrically connected to node 110 through resistor R1 and ZT2. Therefore, when node 120 is more positive than node 110, a current may pass through both the first and second series circuits—into node 120 and out node 110. In contrast, when node 110 is more positive than node 120, current may only pass only through the first series circuit 112—into node 110 and out of node 120.

In the preferred embodiment of the invention resistor R1 is intended to be a 1% precision metal film resistor, and diode D1 may be a 1N4148 manufactured by ITT of California, USA, and have a forward voltage of 1.0V at 10 ma. Temperature sensing component ZT1 is intended to have a positive temperature coefficient, and ZT2 is intended to have a negative temperature coefficient.

Figure 2:
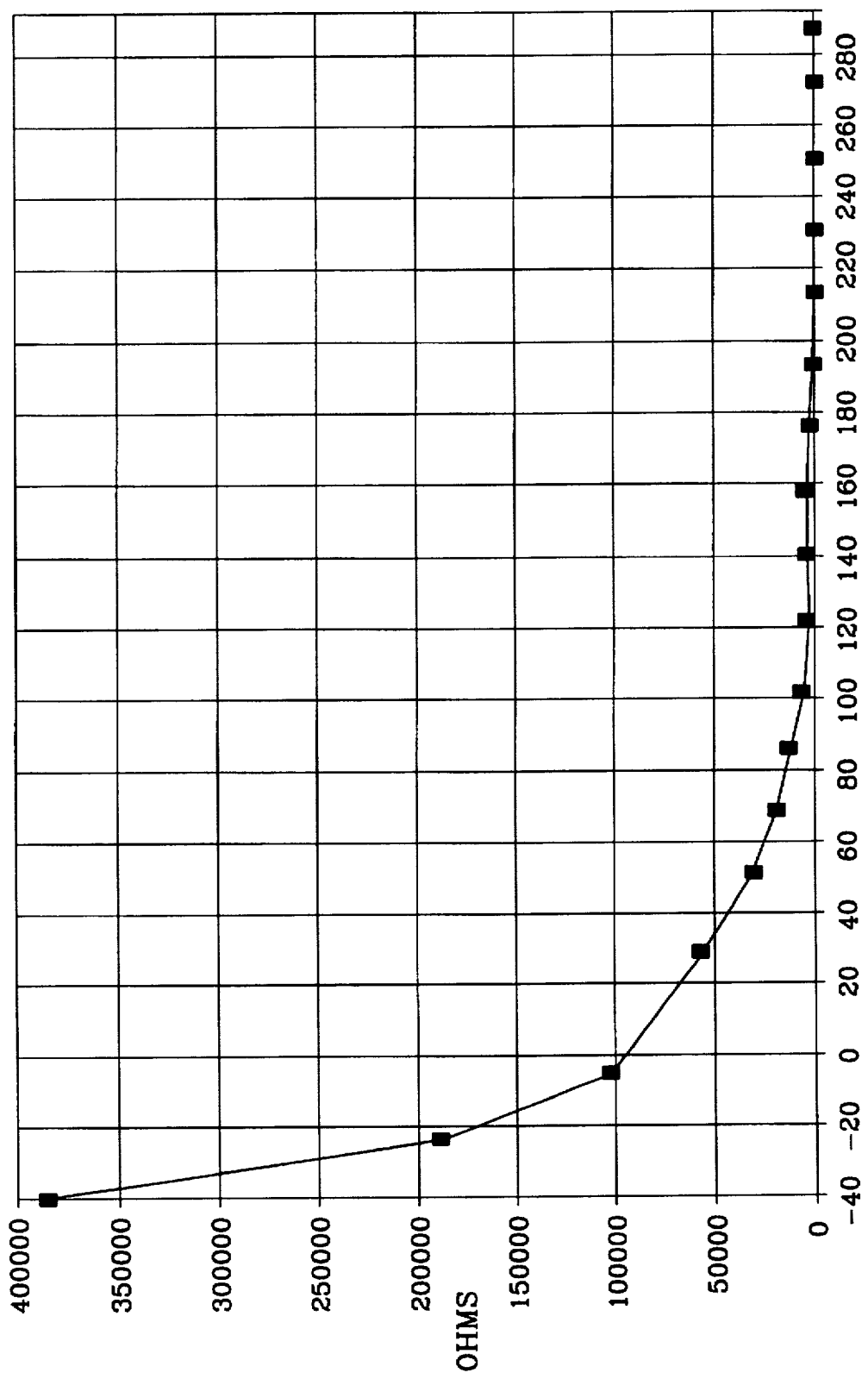
FIG. 2 is a graphical representation of resistance versus temperature for a negative temperature coefficient resistive temperature sensing component.
Figure 3:
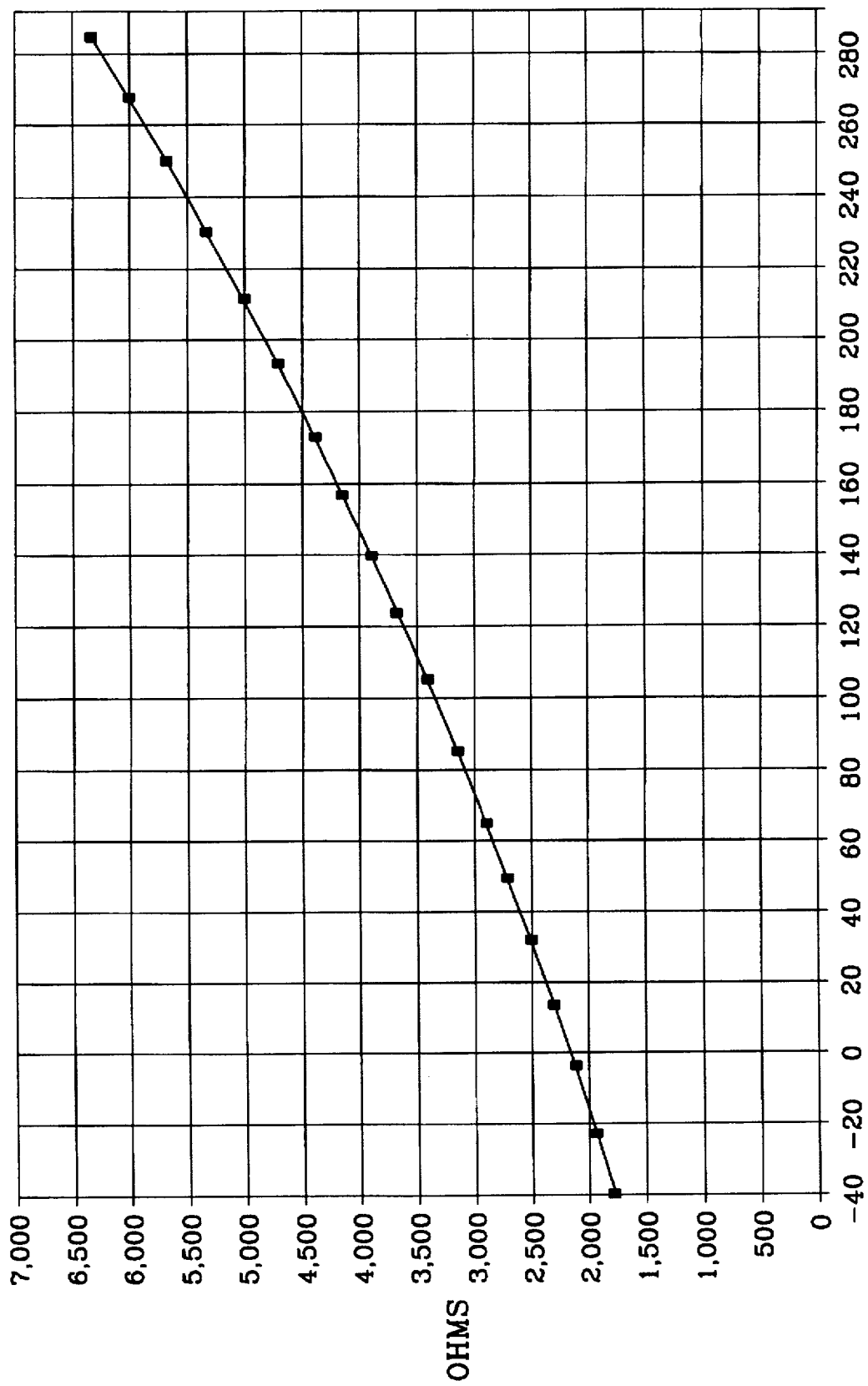
FIG. 3 is a graphical representation of resistance versus temperature for a positive temperature coefficient resistive temperature sensing component.

An exemplary choice for ZT1 is a silicon temperature sensor manufactured by U.S. Sensor Corp., of California, USA, having a nominal resistance of 3000 ohms and a positive temperature coefficient in the order of 25 ohms per degree centigrade. An exemplary choice for ZT2 is a thermistor manufactured by Fenwal Electronic Inc. having a nominal resistance value 10,000 ohms at 25° C. and a non linear negative temperature coefficient in the order of −200 ohms per degree centigrade. Exemplary temperature characteristics for ZT1 and ZT2 are illustrated in FIGS. 3 and 2, respectively.

Before proceeding, it should be noted that in the preferred embodiment of the invention, for the condition that node 110 has a more positive potential relative to node 120, current will flow into node 110 substantially only through ZT1, and out of node 120. Therefore, in these circumstances, the effective impedance of the temperature sensing circuit means 100 is the impedance of only ZT1—i.e., the positive temperature coefficient resistive temperature sensing component having a nominal value of 3000 ohms.

In contrast, for the condition that 120 has a more positive potential relative to node 110 in excess of the forward diode breakover voltage, current will flow into node 120 and out of node 110. In these circumstances, the temperature sensing circuit means 100 exhibits an effective impedance, herein referred to as $R_{NET}$ being substantially the impedance of ZT1 in parallel with the sum of the impedances of ZT2 and resistor R1. By proper selection of these latter three components, the effective impedance can be forced to have a somewhat flat temperature characteristic over a selected temperature range as particularly illustrated in FIGS. 4 and 5.

Figure 4:
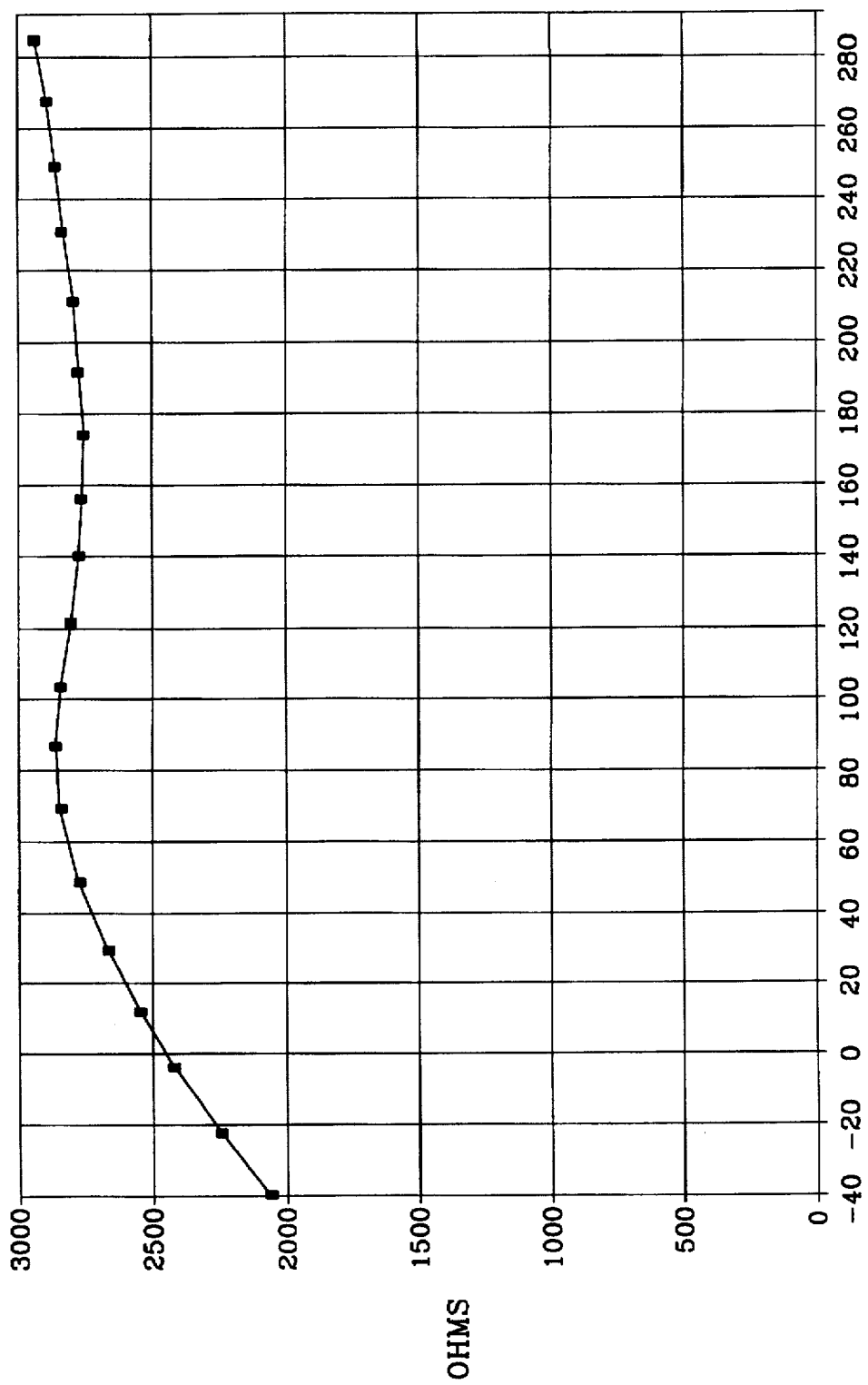
FIG. 4 is a graphical representation of resistance versus temperature for the parallel circuit combination in accordance with the present invention.
Figure 5:
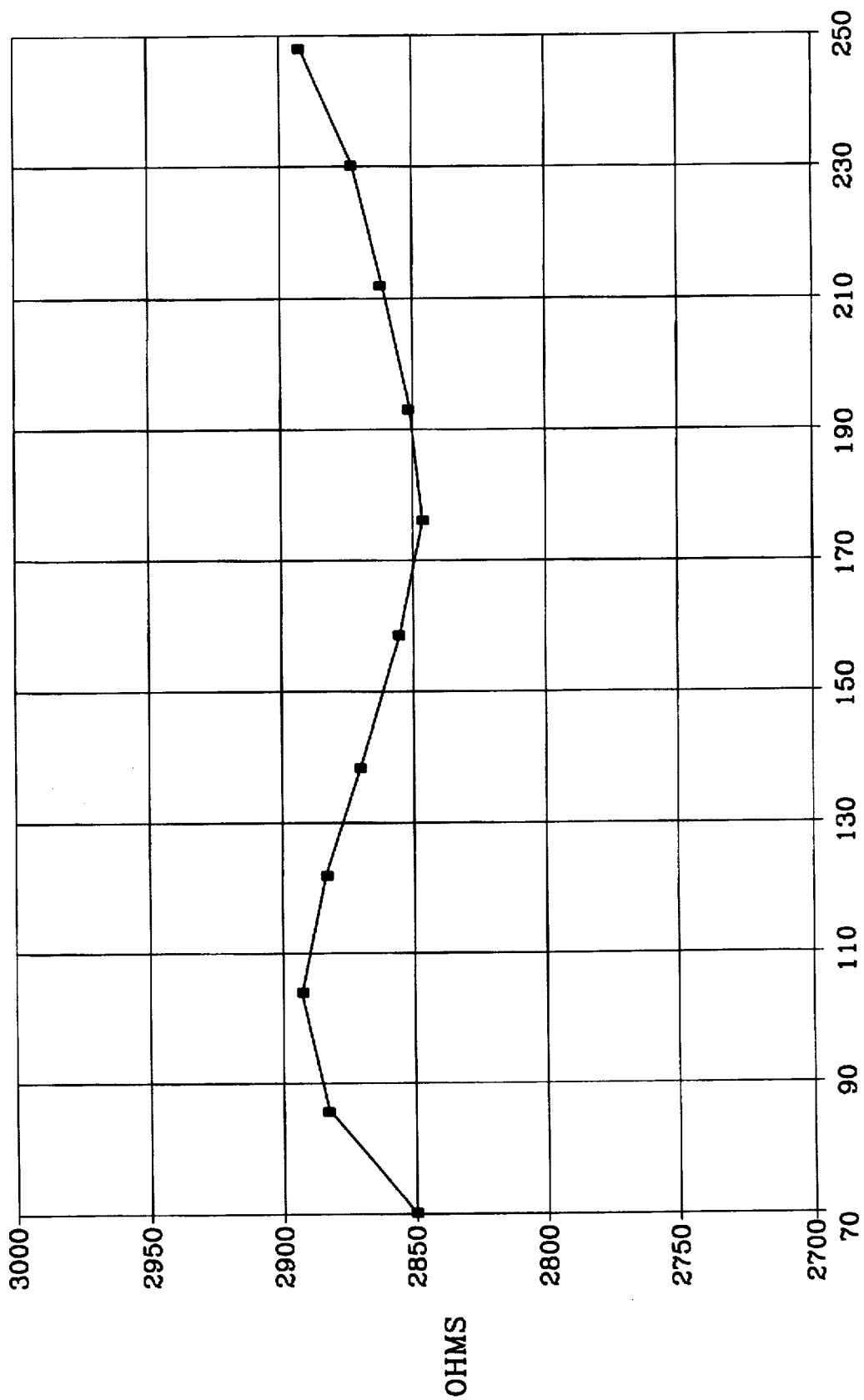
FIG. 5 is a more detailed graphical representation of FIG. 4.

FIG. 4 illustrates the temperature characteristic of the aforesaid effective impedance over temperature range of −40 to +280 degrees Fahrenheit for those nominal values of the components of the temperature sensing circuit as aforesaid. FIG. 5 shows in more detail the temperature characteristic illustrated in FIG. 4 over a temperature range between +70 and +250 degrees Fahrenheit.

As may be seen particularly in FIG. 5, the effective impedance between +70 and +250 degrees Fahrenheit is at times positive and negative and is approximately 2875 ohms plus or minus 25 ohms.

As will be discussed below, it is this "flat" characteristic which provides for the ability of a self checking temperature sensing circuit in accordance with the present invention which may be employed in heating plant high limit control circuits and provide a fail-safe failure mode—i.e., all failure modes of either sensor result in a safe failure mode as will be subsequently described.

Further illustrated in FIG. 1 is an application of a common RC charging circuit employing the temperature sensing circuit in accordance with the present invention. Node 110 is electrically connected to pole P of switch SW2 through limit resistor R4. One electrode of capacitor C1 is electrically coupled to node 120 through a limit resistor R2, to pole P of switch SW1 through precision resistor R3, and to input means 22 of comparator 20. The other electrode of capacitor C1 is electrically coupled to electrical ground. The output of comparator 20 is presented as an input to signal processor 50.

Switches SW1 and SW2 are controlled by switch control 40 having outputs for controlling switches SW1 and SW2 respectively. Switch control 40 is operative for independently controlling switches SW1 through signal line 44, and SW2 through signal line 42 to cause either switch pole P of switches SW1 and SW2 to be in an open condition as illustrated, electrically connected to contact A which is electrically connected to the positive polarity of an electric potential $V_O$, or electrically connected to contact B which is electrically connected to electrical ground. Switch control 40 receives an input signal from signal processor 50 on signal line 52 for determining the state of switches SW1 and SW2.

The operation of the RC circuitry of FIG. 1 will now be described with reference to the following Table:

| CONDITION | SW1 POSITION | SW2 POSITION | DIODE D1 STATE | CAPACITOR STATE | TIME CONSTANT |
| --- | --- | --- | --- | --- | --- |
| A | A | OPEN | INOPERATIVE | CHARGING | T1 = R3 × C1 |
| B | OPEN | B | FORWARD BIASED | DISCHARGING | T2 = $R_{NET}$ × C1 |
| C | OPEN | A | REVERSED BIASED | CHARGING | T3 = ZT1 × C1 |
| D | B | OPEN | INOPERATIVE | DISCHARGING | T4 = R3 × C1 |

In accordance with the present invention, consider the application of the temperature sensing circuit means for hot water heating systems employing a boiler. In these circumstances, it is intended to detect the occurrence of a temperature exceeding a high limit value, for example 200 degrees Fahrenheit, and where the normal water temperature is in excess of 70 degrees Fahrenheit. In these circumstance $R_{NET}$ will exhibit the "flat" characteristic over the desired temperature range of interest as illustrated in FIG. 5—namely, $R_{NET}$ will be in the range between 2850 and 2900 ohms.

Consider the alternate situations where C1 discharges through switch SW1 in position B, or discharges through switch SW2 in position B. In accordance with the above table, in the just mentioned temperature range, the time constant ratio T2:T4 will be proportional to the ratio $R_{NET}$:R3 which is designed to be substantially a constant having a variation only dependent upon any variation of the flatness of the empirically determined resistance range—namely a total variation of 50 ohms. This is so since R3 is substantially a constant and $R_{NET}$ is substantially a constant. For a 3.3 microfarad capacitor, the time constant range due to variations only in $R_{NET}$ would be in the order of 9.570 to 9.405 msec (9.4875±0.87% msec).

Now consider the alternate situations where C1 is charged through either switch SW2 in position A, or through switch SW1 in position A. Then from the above table, in the just mentioned temperature range, the time constant ratio T3:T1 will be proportional to the ratio ZT1:R3 Since R3 is substantially a constant, this ratio will vary directly proportional to the value of the PTC resistance of ZT1, and, corresponding temperature sensed by ZT1 as exemplified by the temperature characteristic illustrated in FIG. 3.

The aforementioned time constants particularly depicted in the above table may be easily monitored and measured by a variety of schemes well known in the art. One example, without detail, is illustrated in FIG. 1. Thereshown is the employment of comparator 20 for monitoring the output voltage of capacitor C1. Comparator output signal on signal line 24 is presented to signal processor 50. Comparator 20 compares the capacitor output voltage with a reference voltage and causes the comparator output to indicate that the capacitor output voltage is above or below a reference voltage.

In turn, signal processor 50 may be configured to control the action of switches SW1 and SW2 depending upon the timing ratio which is desired to be determine. From the timing ratio information obtained by signal processor 50, signal processor 50 may provide an output on signal line 58 representative of the temperature sensed by ZT1—diode D1 reversed biased; and/or provide a high limit signal on signal line 60 indicative of the temperature of the boiler exceeding a preselected value. It should be noted that a single signal line alternatively could be used, or the like, for subsequent system control.

As aforesaid, if all is functioning properly over the desired operating range of the boiler, $R_{NET}$ will be substantially a constant thereby self checking the condition of both temperature sensing components ZT1 and ZT2. If, on the other hand, the resistance values of either ZT1 or ZT2 drift away from their nominal values, the ratio T2:T4 will be observed to fall outside predetermined limits. In turn signal processor may provide a "failure" signal command on output signal line 60. Such a failure signal would also occur if either ZT1 or ZT2 electrically shorts or opens. At the same time, if the temperature sensing circuit is functioning properly, a high limit temperature sensed by ZT2 may be detected by monitoring the ratio T3:T1. Since this ratio increases with increasing temperature due to ZT1 impedance increasing with increasing temperature (PTC), a high limit signal may be issued upon the ratio exceeding a pre-selected value. It should be noted, of course, that ZT1 failing open would indicate a high temperature—a fail safe failure.

The block diagram of the switch control 40 and signal processor 50 is of course only exemplary. These functional blocks are particularly suitable for being incorporated in a micro-processor based system for achieving the intended control, monitoring and detection functions as should be appreciated by those skilled in the art.

It should be appreciated by those skilled in the art that the behavior of the impedance characteristics of temperature sensing circuit 100 may monitored by other means than RC circuitry where charging and discharging time constants are monitored. The principal in accordance with the present invention is the behavior of the effective impedance between nodes 110 and 120 for the two conditions of polarity: (1) when node 110 is more positive than 120, and (2) when node 120 is more positive than node 110 and in excess of the forward breakover voltage drop of diode D1. The addition of the rectifying means, diode D1, brings about the polarity sensitive effective impedance $R_{NET}$. That is, as already described, in one polarity the effective impedance of the temperature sensing circuit is the impedance value of ZT1, and in the other polarity is the effective impedance $R_{NET}$.

When the intended application of the temperature sensing circuit means in accordance with the present invention is for a limit function, it is intended that $R_{NET}$ be characteristically flat over the desired temperature operating range. The characteristic flatness of temperature versus resistance is of course dependent upon the nominal resistance values of ZT1 and ZT2, as well as choice of resistor R1, and as such is either empirically or mathematically determined. There are, of course many combinations, all of which are intended to be within the true spirit and scope of the present invention.

The foregoing description of the invention is necessarily detailed so as to provide understanding of the invention's best mode of practice. It is to be understood, however, that various modifications of detail, rearrangement, addition, and deletion of components may be undertaken without departing from the invention's spirit, scope, or essence.

In particular, the polarity of diode D1 may be reversed thereby affecting the polarity of the operative conditions of the temperature sensing circuit means as described. Further, resistor R1 may also be located in a different series order than shown in FIG. 1. Of course, other circuit components may be added or removed, all of which are intended to be within the scope of the present invention.

The embodiments of an invention in which an exclusive property or right is claimed are defined as follows:

1. A temperature sensing circuit comprising:
   first and second electrical circuit terminating means;
   a first temperature sensing means electrically connected in a first series circuit between said first and second electrical circuit terminating means, said first temperature sensing means having an electrical impedance which increases with increasing temperature in accordance with a positive temperature coefficient characteristic;
   a second series circuit electrically connected in parallel with said first series circuit, said second series circuit including an electrical series combination of,
   a first resistor,
   a second temperature sensing means having an electrical impedance which decreases with increasing temperature in accordance with a negative temperature coefficient characteristic, and
   a current rectifying means, said current rectifying means operative for permitting current to pass through said electrical series combination of said second series circuit in one direction, and to substantially block any current from passing therethrough in the opposite direction; and
   wherein said electrical impedance of at least said first and second temperature sensing means and said first resistor are selected to have nominal values at a selected temperature such that the effective impedance of the parallel combination of said first and second series circuits characteristically exhibits a relatively low temperature coefficient of impedance in comparison to either of said first and second temperature sensing means alone.

2. The temperature sensing circuit of claim 1 further comprising:
   source means for causing an electrical signal current to flow in a first direction into said first terminating means and out of said second terminating means; and
   means for determining a first quantity representative of an effective impedance between said first and second terminating means with said electrical signal current flowing in said first direction.

3. The temperature sensing circuit of claim 2 further comprising:
   source means for causing an electrical signal current to flow in a second direction into said second terminating means and out of said first terminating means; and
   means for determining a second quantity representative of an effective impedance between said first and second terminating means with said electrical signal current flowing in said second direction.

4. The temperature sensing circuit of claim 1 further comprising a capacitor having first and second electrode means where said first electrode means is electrically coupled to a selective one of said first and second electrical circuit terminating means, and which is adapted to be selectively charged or discharged through said parallel combination of said first and second series circuits.

5. The temperature sensing circuit of claim 4 wherein said capacitor is selectively charged through a selected resistor, having a selected value, and having one terminating side thereof electrically coupled to said first electrode of said capacitor.

6. The temperature sensing circuit of claim 5 further comprising a signal processor means adapted for controlling the charging and discharging of said capacitor, and further adapted to determine the effective charging and discharging time constants.

7. The temperature sensing circuit of claim 4 further comprising a signal processor means adapted for controlling the charging and discharging of said capacitor, and further adapted to determine the effective charging and discharging time constants.

8. The temperature sensing circuit of claim 2 further comprising:

means for comparing said first quantity to first and second limit values and providing a first signal indicative of said first quantity having a value not between said first and second limit values.

9. The temperature sensing circuit of claim 8 further comprising:

means for comparing said second quantity to third and fourth limit values and providing a second signal indicative of said second quantity being selectively above or below said third and fourth limit values.

10. The temperature sensing circuit of claim 1 wherein said effective impedance of said parallel combination of said first and second series circuits, in the circumstances with said current rectifying means blocking current and at the same time flowing through said first temperature sensing means, is representative of the temperature served by said first temperature sensing means.

11. A temperature sensing circuit comprising:

first and second electrical circuit terminating means;

a first temperature sensing means electrically connected in a first series circuit between said first and second electrical circuit terminating means, said first temperature sensing means having an electrical impedance which increases with increasing temperature in accordance with a positive temperature coefficient characteristic;

a second series circuit electrically connected in parallel with said first series circuit, said second series circuit including an electrical series combination of, a first resistor, a second temperature sensing means having an electrical impedance which decreases with increasing temperature in accordance with a negative temperature coefficient characteristic, and a current rectifying means, said current rectifying means operative for permitting current to pass through said electrical series combination of said second series circuit in one direction, and to substantially block any current from passing therethrough in the opposite direction; and wherein said electrical impedance of at least said first and second temperature sensing means and said first resistor are selected to have nominal values at a selected temperature such that the effective impedance of the parallel combination of said first and second series circuits exhibits a predictable temperature versus resistance characteristic distinguishable over that of either of said first and second temperature sensing means alone.

* * * * *

UNITED STATES PATENT AND TRADEMARK OFFICE
CERTIFICATE OF CORRECTION

PATENT NO. : 5,748,429
DATED : May 5, 1998
INVENTOR(S) : Scott M. Peterson

It is certified that error appears in the above-indentified patent and that said Letters Patent is hereby corrected as shown below:

In the ABSTRACT line 7,
  cancel "restrictive" and insert --resistive--.

Signed and Sealed this

Fifth Day of January, 1999

Attest:

Attesting Officer

*Acting Commissioner of Patents and Trademarks*